US009611121B2

(12) United States Patent
Tavares De Pinho et al.

(10) Patent No.: US 9,611,121 B2

(45) Date of Patent: Apr. 4, 2017

(54) REINFORCEMENT ASSEMBLY FOR BANKNOTE DISPENSERS ON AUTOMATIC TELLER MACHINES

(71) Applicants: TECNOLOGIA BANCARIA S.A., Barueri (ES); JHJ CONSTRUÇÃO CIVIL LTDA, Curitiba (BR)

(72) Inventors: Nelson Tavares De Pinho, São Paulo (BR); José Arquimedes Gregório, Curitiba (BR)

(*) Notice: Subject to any disclaimer, the term of this patent is extended or adjusted under 35 U.S.C. 154(b) by 0 days.

(21) Appl. No.: 14/849,549

(22) Filed: Sep. 9, 2015

(65) Prior Publication Data

US 2016/0076296 A1 Mar. 17, 2016

(30) Foreign Application Priority Data

Sep. 11, 2014 (BR) .......................... 10 2014 022526

(51) Int. Cl.

*G06K 7/00* (2006.01)
*B65H 31/26* (2006.01)
*G07F 19/00* (2006.01)
*E05G 1/024* (2006.01)

(52) U.S. Cl.

CPC ............. *B65H 31/26* (2013.01); *G07F 19/20* (2013.01); *G07F 19/205* (2013.01); *B65H 2402/443* (2013.01); *B65H 2402/45* (2013.01); *E05G 1/024* (2013.01)

(58) Field of Classification Search

USPC ................................ 235/375, 379, 380, 385
See application file for complete search history.

(56) References Cited

U.S. PATENT DOCUMENTS 4,612,864 A * 9/1986 Beck ....................... G07F 19/20 109/24.1
5,984,177 A * 11/1999 Do ..................... G07D 11/0081 235/379

* cited by examiner

*Primary Examiner* — Matthew Mikels
(74) *Attorney, Agent, or Firm* — Ladas & Parry LLP

(57) ABSTRACT

"REINFORCEMENT ASSEMBLY FOR BANKNOTE DISPENSERS ON AUTOMATIC TELLER MACHINES", wherein it reinforces the banknote dispenser for ATM and Cash Dispenser equipment units using a protection system including carbon steel plates comprised of four pieces for assembling the protection system against direct impact attacks and use of explosives on the machine. This protection is fixed through welding, where no physical alteration is needed on the cassette module or on the ATM safe in order to install the protection device. This installation may be performed on the field by a properly trained and equipped technician. The protection system has already been tested and resisted to direct impact tests for a considerable period of time; on a real scenario, the sheer amount of time taken to gain access to the banknote is a strong enough reason for giving up on the theft, which shows the security device is successfully approved.

6 Claims, 11 Drawing Sheets

REINFORCEMENT ASSEMBLY FOR BANKNOTE DISPENSERS ON AUTOMATIC TELLER MACHINES

CROSS-REFERENCE TO RELATED APPLICATION

This application claims priority to Brazilian Patent Application No. 10 2014 022526 9 filed on Sep. 11, 2014, the disclosure of which is hereby incorporated by reference in its entirety.

This specification refers to an invention patent application, which presents a security device for attachment on ATMs (Automatic Teller Machines) banking equipment, also known as automatic cash dispensers, self-service terminals, as well as cash supply equipment, which are also known as Cash Dispensers. The security device presented herein comprises an assembly of reinforcement components made of carbon steel destined for the banknote dispenser.

As is widely known, bank institutions have provided customers, for several years with a variety of facilities, among which are the ATMs that, as a general rule, work as extensions, so to speak, of the bank institutions themselves; in other words, they are able to perform all, or nearly all, functions performed within the bank institutions, and among this variety of functions is the redemption of funds, commonly known as cash withdrawals.

Bank institutions also provide equipment units known as Cash Dispensers, which enable withdrawals and other operations, and can be assembled in public places with large circulation of people.

In order to perform the function of redemption of funds, these equipment units need cash money, and there are some negative aspects to this factor, most of them related to security.

In general, both ATM and Cash Dispenser-type installations feature an assembly, which should provide security against violation attempts. However, in recent times, the violent techniques employed by criminal crews against this kind of equipment, ATMs and Cash Dispensers have demonstrated the need for reformulation of protection means.

In face of such condition, the present patent application features a set of reinforcement components for banknote dispensers, which aims to reduce the dispensing space of banknote to the minimally essential, since this space is widely used in attacking ATMs employing explosives. Besides reducing this dispensing area for banknote, the proposed protection plate (one of the components of the set of reinforcement components) is reinforced and aims to increase difficulty in case of attacks made with crowbars and equipment that force the opening of the banknote dispenser. This new solution was tested on Diebold and NCR equipment units and shall be featured as an additional way to increase ATM security.

The “REINFORCEMENT ASSEMBLY FOR BANKNOTE DISPENSERS ON AUTOMATIC TELLER MACHINES”, depending on the type of equipment to which it is destined, Diebold, NCR or other, comprises:

a) reinforcement of the front dispenser;
b) finishing plate;
c) lower panel finishing; and
d) welding fixing.

This invention patent application shall be better understood, in all its details, through the following description, which is based on the figures listed below, where:

Figure 1:
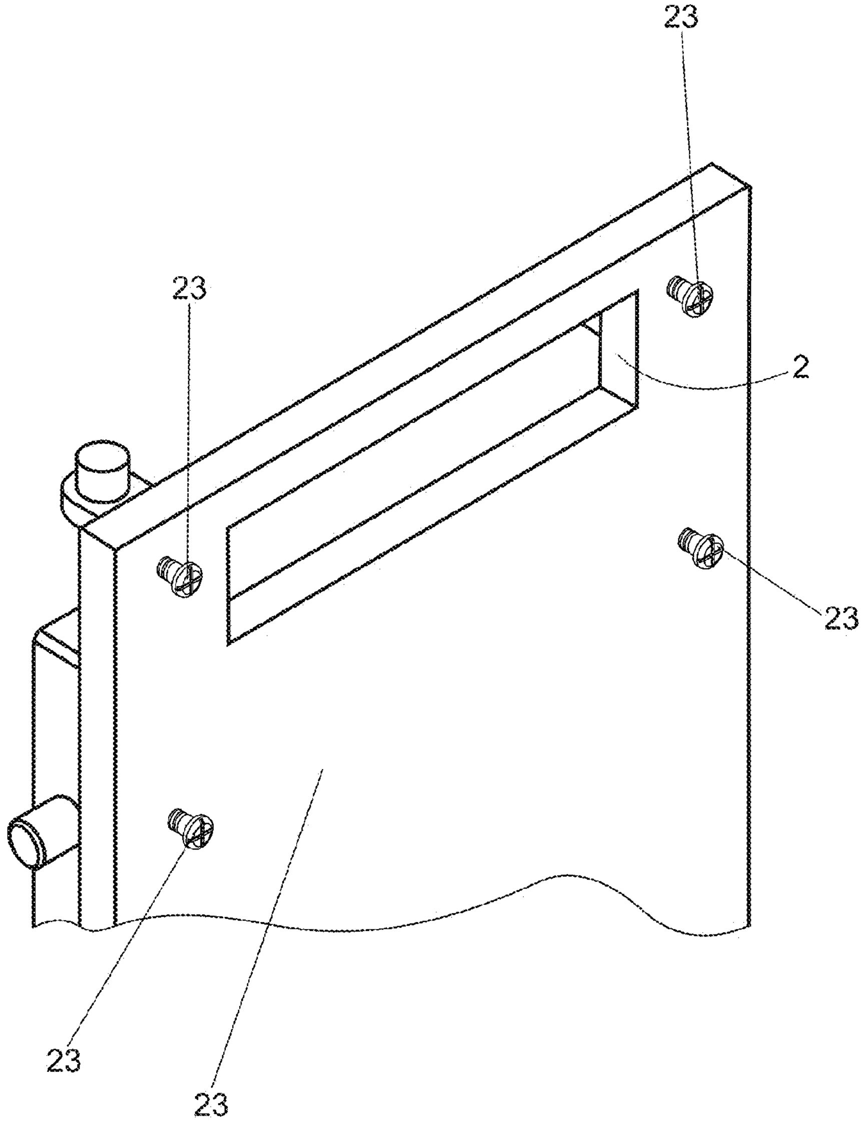
FIG. 1 shows a general schematic view of the safe door of a Diebold equipment, model 6135, still without the set of reinforcement components presented herein.
Figure 2:
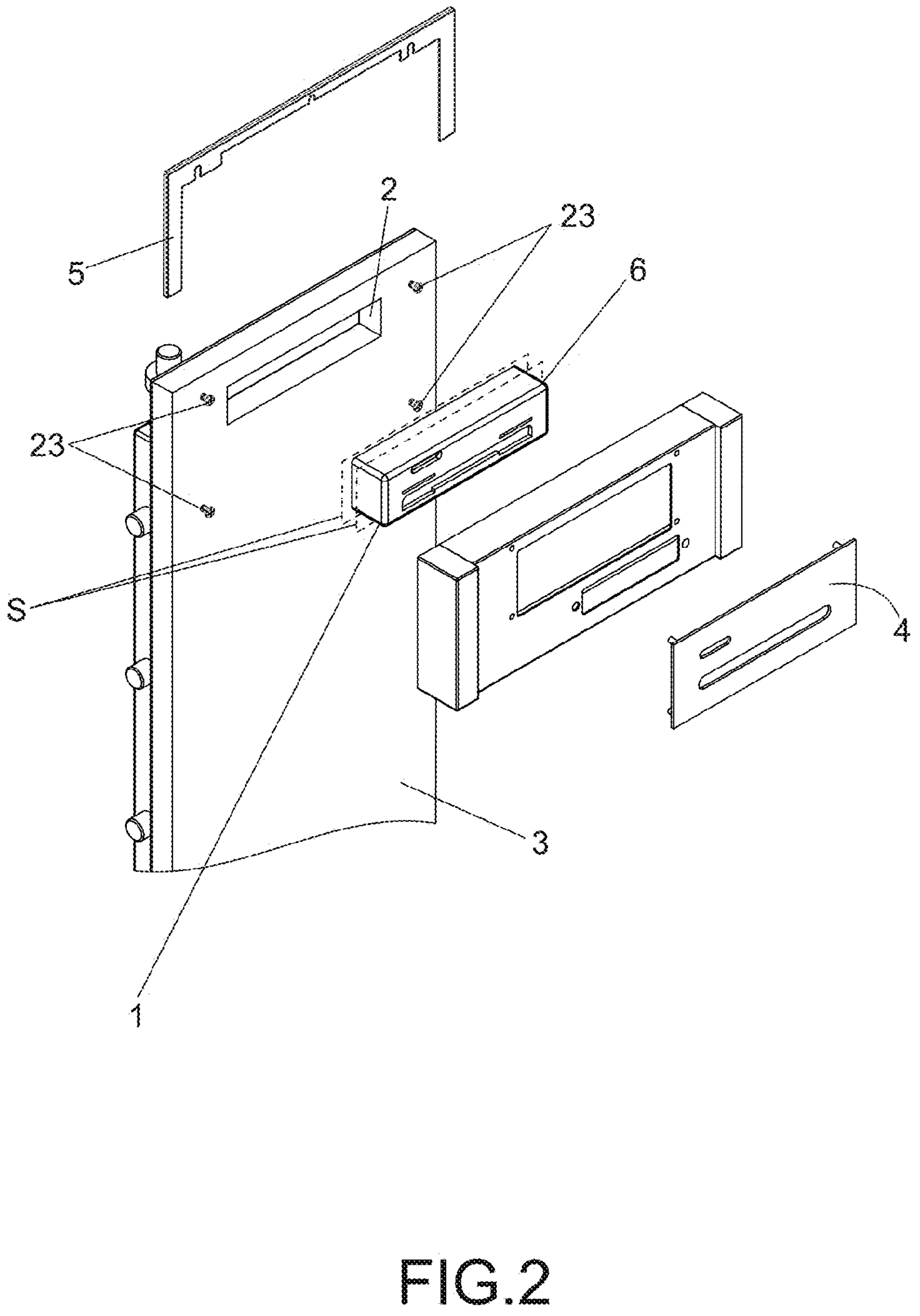
FIG. 2 shows an exploded perspective view of the components of the assembly of reinforcement components for use on Diebold equipment, model 6135, where said components are portrayed in a position in relation to the door of the Diebold equipment, model 6135.

In general, the “REINFORCEMENT ASSEMBLY FOR BANKNOTE DISPENSERS ON AUTOMATIC TELLER MACHINES”, object of this invention patent application, has as its objective to make attempts from criminals to place explosives inside the shutter (device which dispenses banknote from the automatic teller machine, through the small door) more difficult.

Made of 1010/1020 carbon steel, said reinforcement assembly features good resilience against direct impact attacks. The reinforcement assembly includes a component, which is the front dispenser reinforcement 1, fixed through welding lines S applied with use of coated electrodes, easily fitted in the space of the opening 2, in the upper region of the door 3 of the safe.

The installation process comprises: positioning the reinforcement of the front dispenser 1 of the banknote dispenser near the opening 2 featured on the door 3 of the safe; fixing through welding lines S over the entirety of the external outline, and over some internal points; fixing of the lower panel with the finishing plate 4; and installation of the finishing of the lower panel 5, thus concluding the installation of the reinforcement assembly for banknote dispenser on Diebold equipment units.

Figure 3:
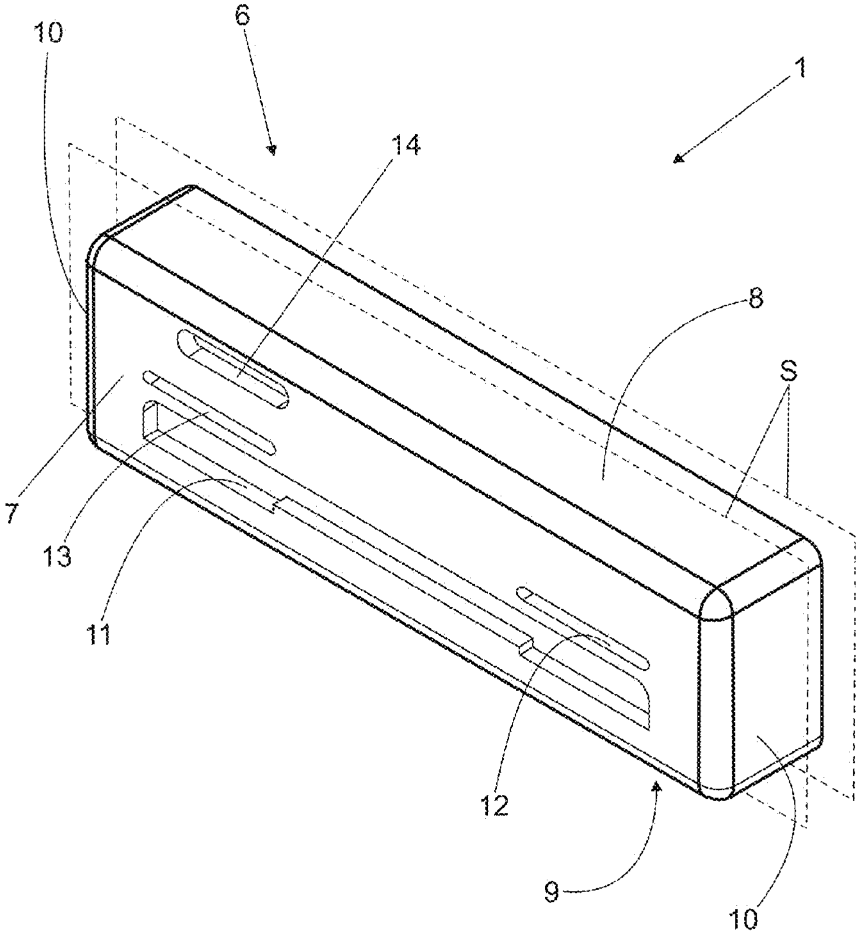
FIG. 3 shows a front perspective view of the reinforcement of the front dispenser for the Diebold equipment, where there is effective reduction of the space for banknote dispensing.
Figure 4:
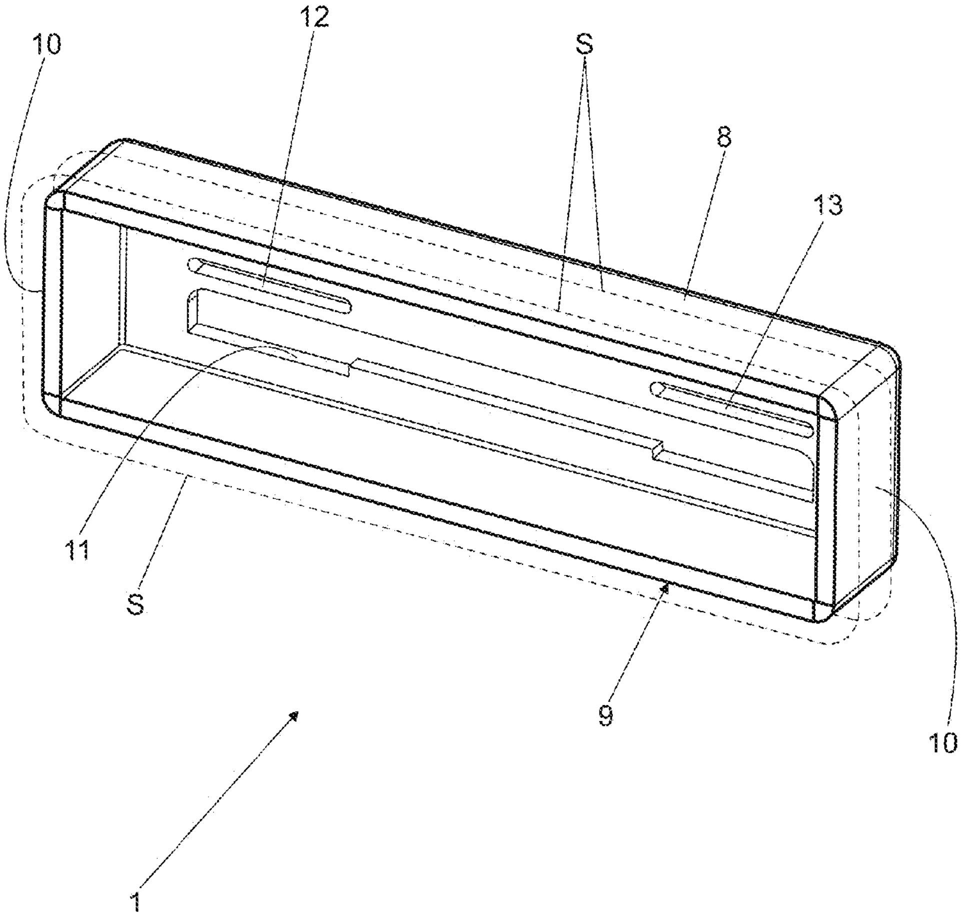
FIG. 4 shows a fore perspective view of the reinforcement of the front dispenser for the Diebold equipment, where there is effective reduction of the space for banknote dispensing.
Figure 5:
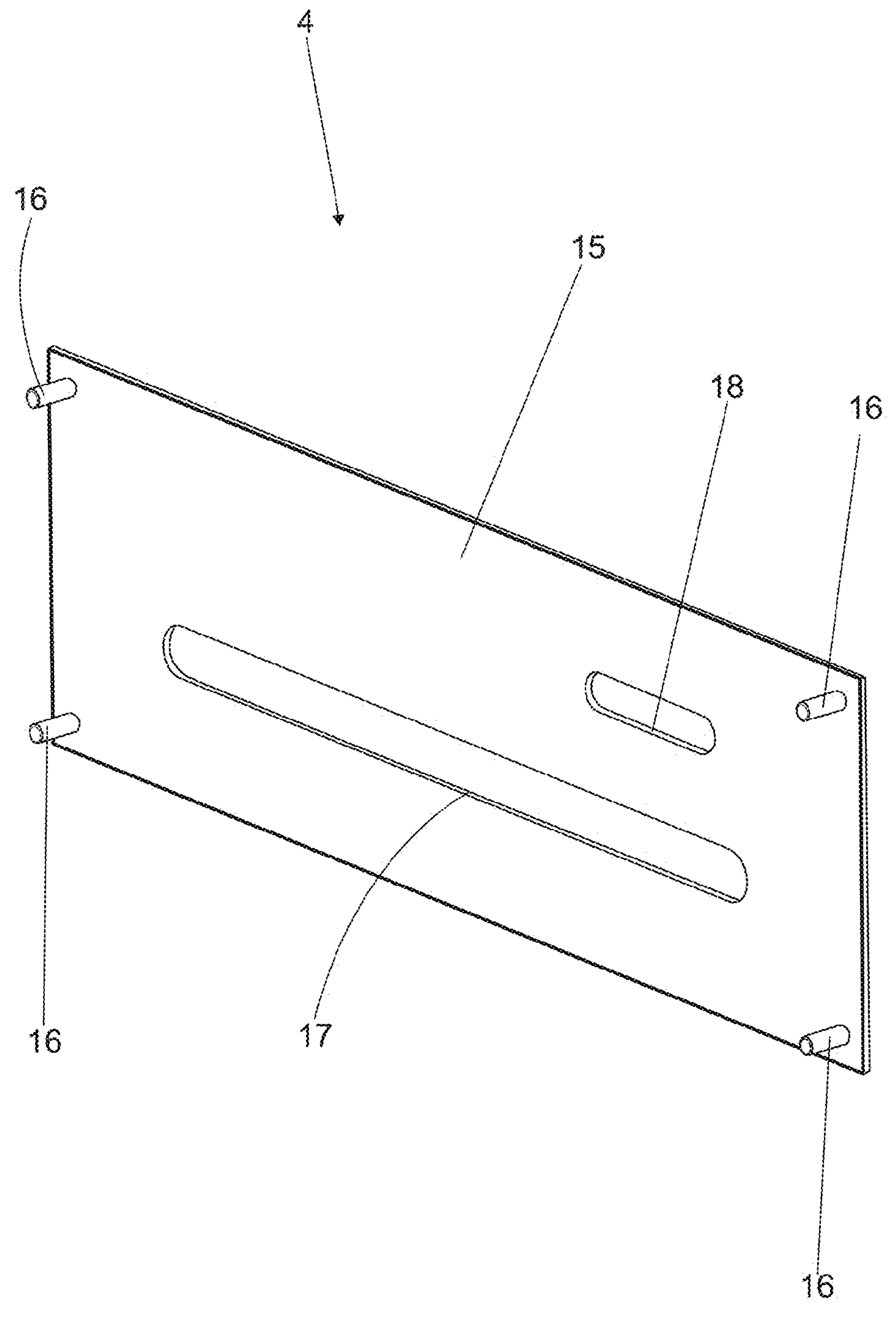
FIG. 5 shows a posterior perspective view of the finishing plate for the Diebold equipment, which is the finishing for the lower panel.
Figure 6:
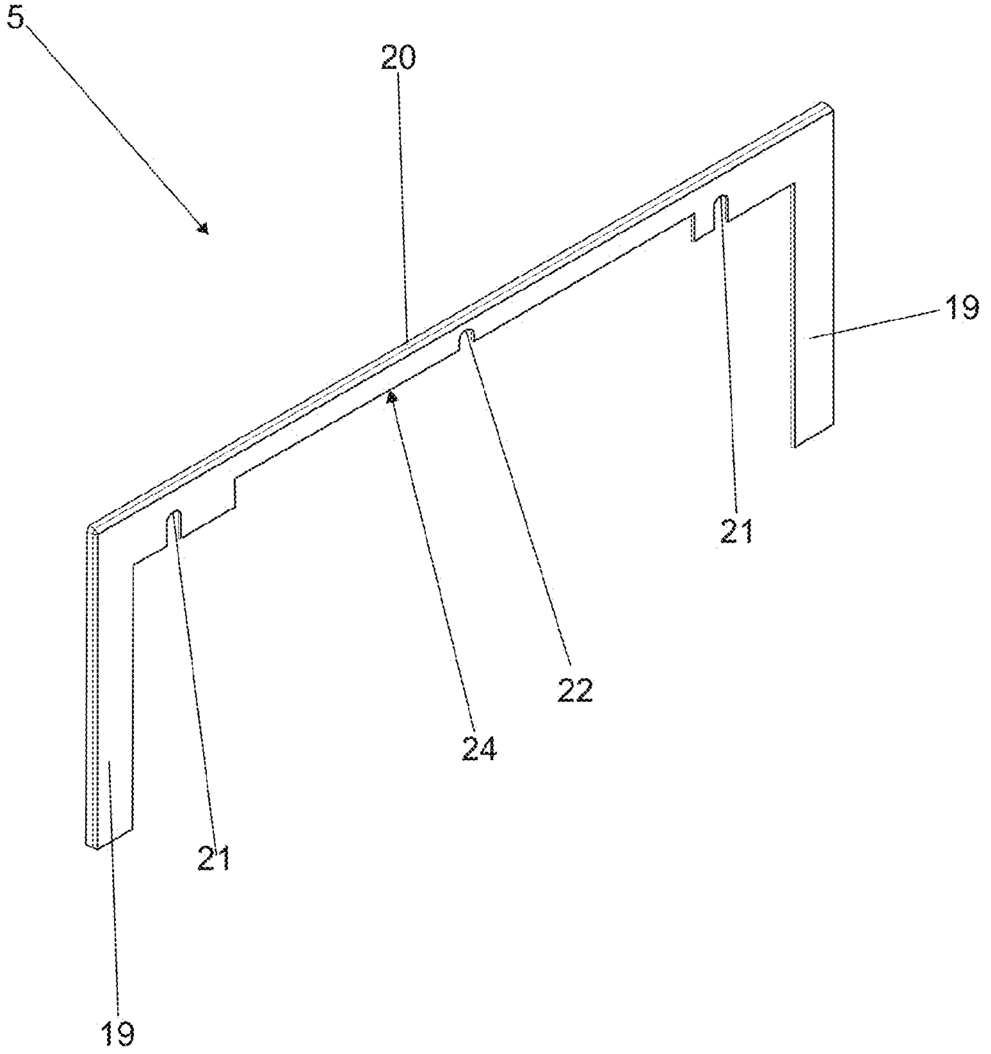
FIG. 6 shows a perspective view of the finishing of the lower panel for the Diebold equipment, which is used in order to conceal the gap between the safe door and the lower panel.
Figure 7:
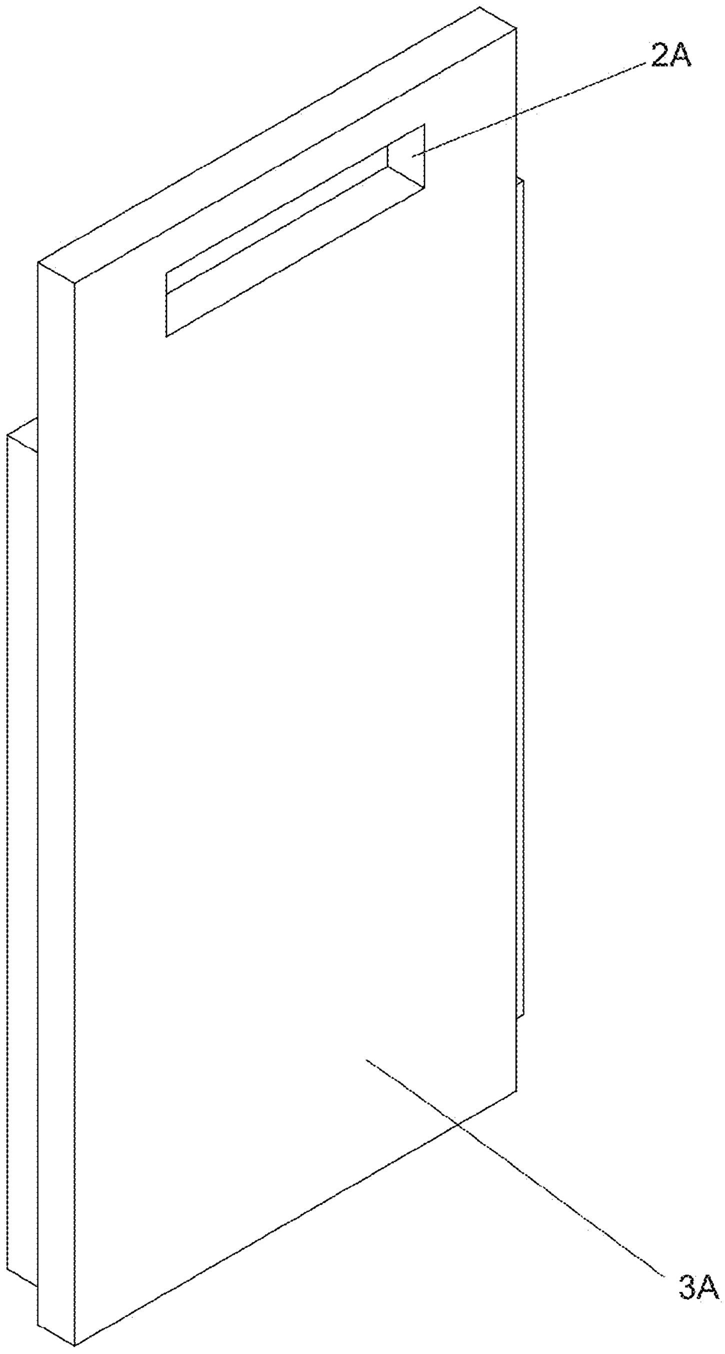
FIG. 7 shows a general schematic view of the safe door of an NCR 6622 equipment still without the set of reinforcement components presented herein.

The reinforcement of the front dispenser 1, separately shown on FIGS. 3 and 4 is defined as an extended parallelepiped-shaped box 6, which features a front surface 7 and perimeter surfaces in relation to said front surface 7 which are defined as: upper surface 8, lower surface 9 and side surfaces 10 with such items 7, 8, 9 and 10 only indicated on FIGS. 3 and 4.

The front surface 7 of the front dispenser reinforcement 1 features pass openings 11, 12, 13 and 14, which are shown on FIGS. 3 and 4, all positioned horizontally in relation to the plane of the front surface 7.

On FIGS. 3 and 4, the path of the welding lines S applied to the reinforcement of the front dispenser 1 are schematically indicated, at the point of joining the opening 2 on the safe door 3.

The finishing plate 4 is defined as a rectangular outline plate 15, which features, on its rear surface, four pins 16 with said rectangular outline plate 15 also featuring two elongated openings, one larger 17 and the other one smaller 18.

The finishing of the lower panel 5 features a laminar configuration with two vertical plate section-shaped branches 19, which are joined together in the upper part by a horizontal branch 20, which includes, on its lower edge, downward-faced cutouts 21 next to its sides and a center cutout also facing downwards 22, being the former two positioned in accordance to the screws 23 of the safe door 3, while the latter is positioned on an indent stripe 24.

The above details relate to the reinforcement assembly model for Diebold banknote dispensers, model 6135, as shown on FIGS. 1 to 6.

FIGS. 7 to 11 show the reinforcement assembly for NCR 6622 banknote dispensers with such assembly being set as a second model of the same reinforcement assembly shown on FIGS. 1 to 6.

Figure 8:
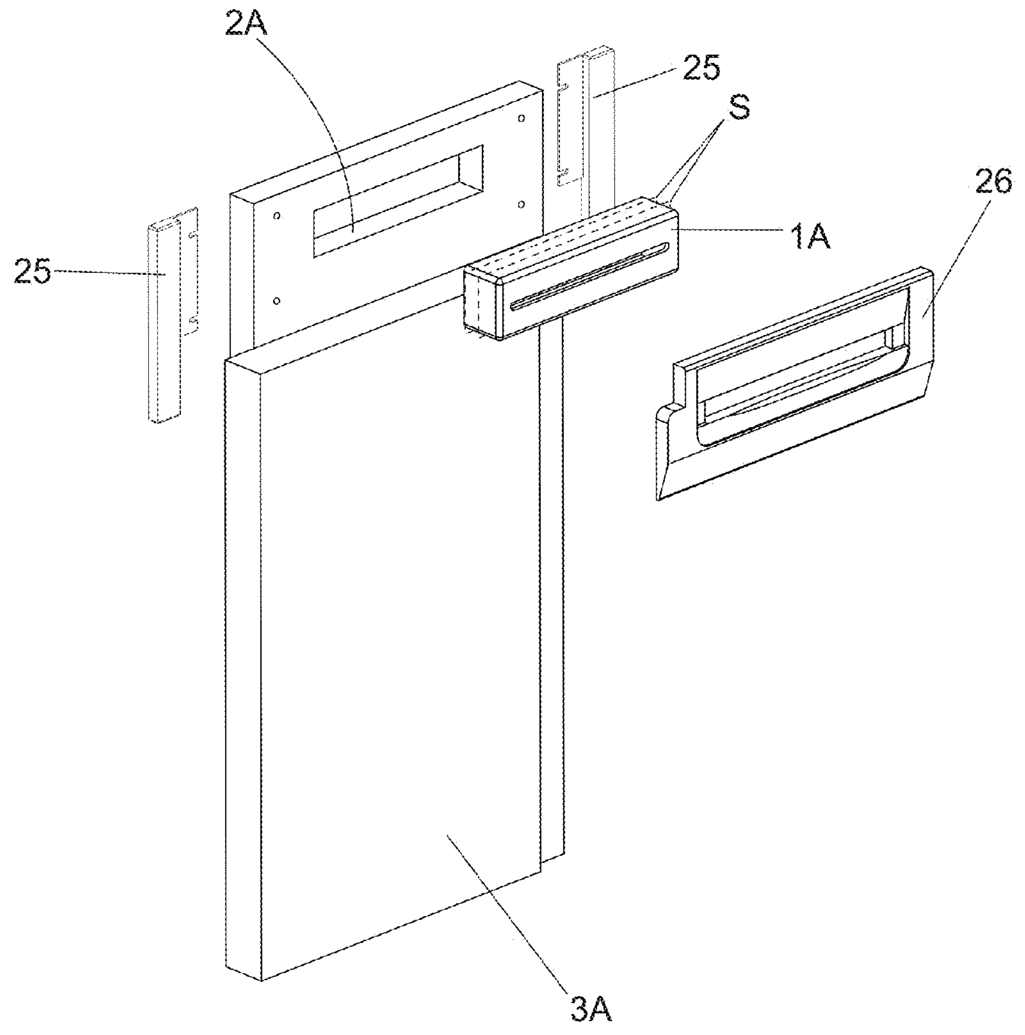
FIG. 8 shows an exploded perspective view of the components from the set of reinforcement components for use on the NCR 6622 equipment.

FIG. 8 shows an exploded perspective view of the components included in the reinforcement component assembly for use in NCR 6622 equipment, where the safe door 3A is shown, and where the reinforcement of the front dispenser 1A may be seen, as well as the side finishing plates 25 and the finishing panel 26, the latter already as part of the structure of the safe door 3A.

As it was verified regarding the reinforcement assembly shown on FIGS. 1 to 6, destined for Diebold equipment model 6135, and also regarding the reinforcement assembly model shown on FIGS. 7 to 11, destined for NCR 6622 equipment, an installation process is provided, which comprises: positioning the reinforcement of the front dispenser 1A of the banknote dispenser near the opening 2A provided on the safe door 3A; fixing through welding lines S over the entirety of the external outline and over some internal points.

Specifically regarding the reinforcement assembly 1A, the lower panel with the finishing plate 4 is not provided, of the lower panel 5, however, side-finishing plates 25 are provided.

Figure 9:
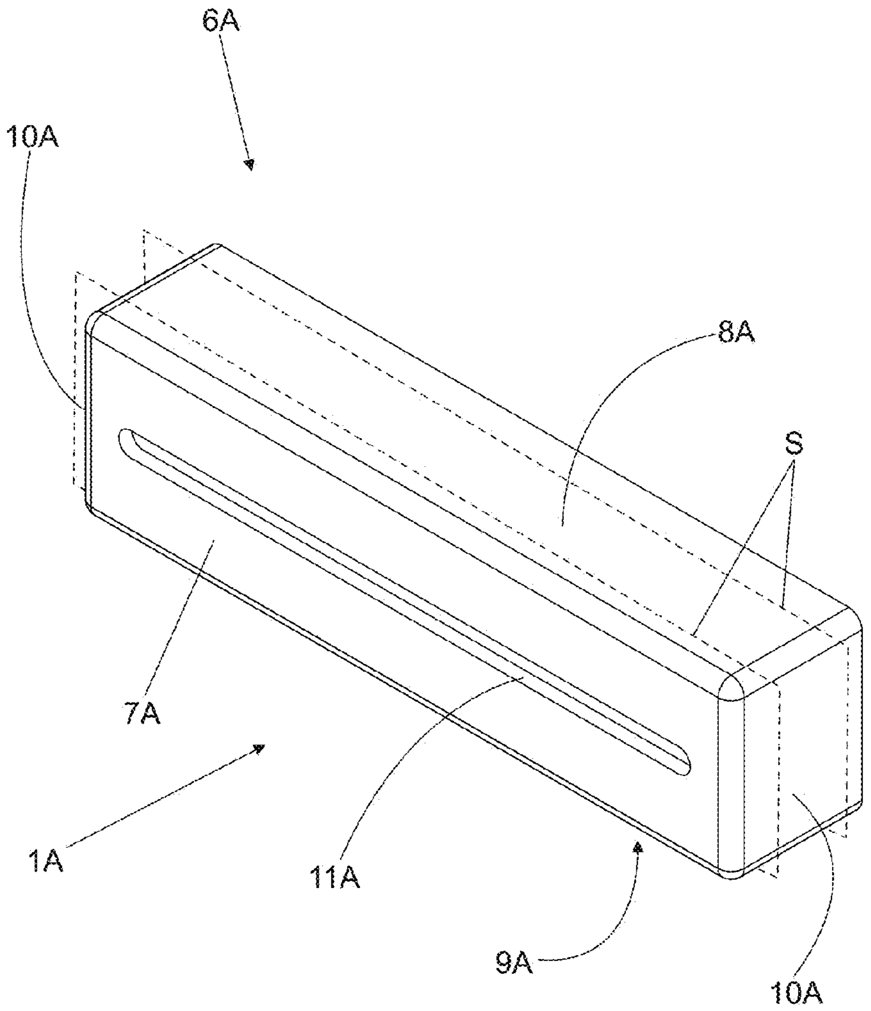
FIG. 9 shows a front perspective view of the reinforcement of the front dispenser for the NCR equipment, where there is effective reduction of the space for banknote dispensing.
Figure 10:
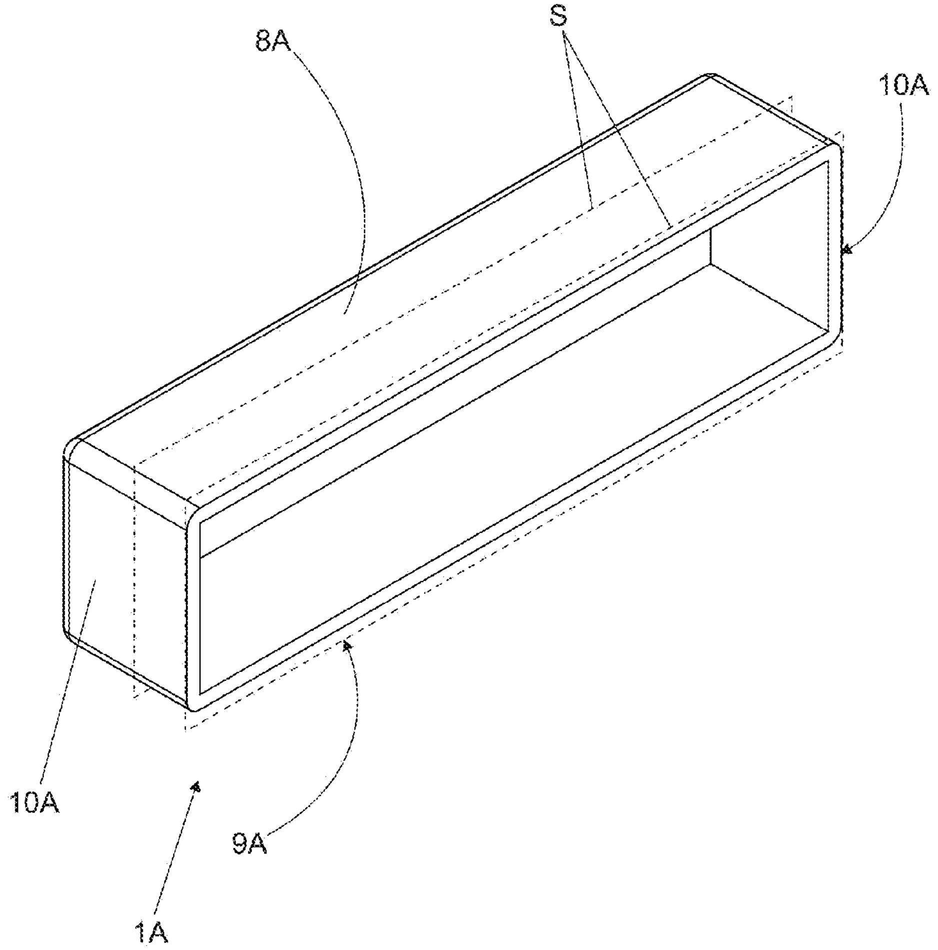
FIG. 10 shows a posterior perspective view of the reinforcement of the front dispenser for the NCR equipment, where there is effective reduction of the space for banknote dispensing.
Figure 11:
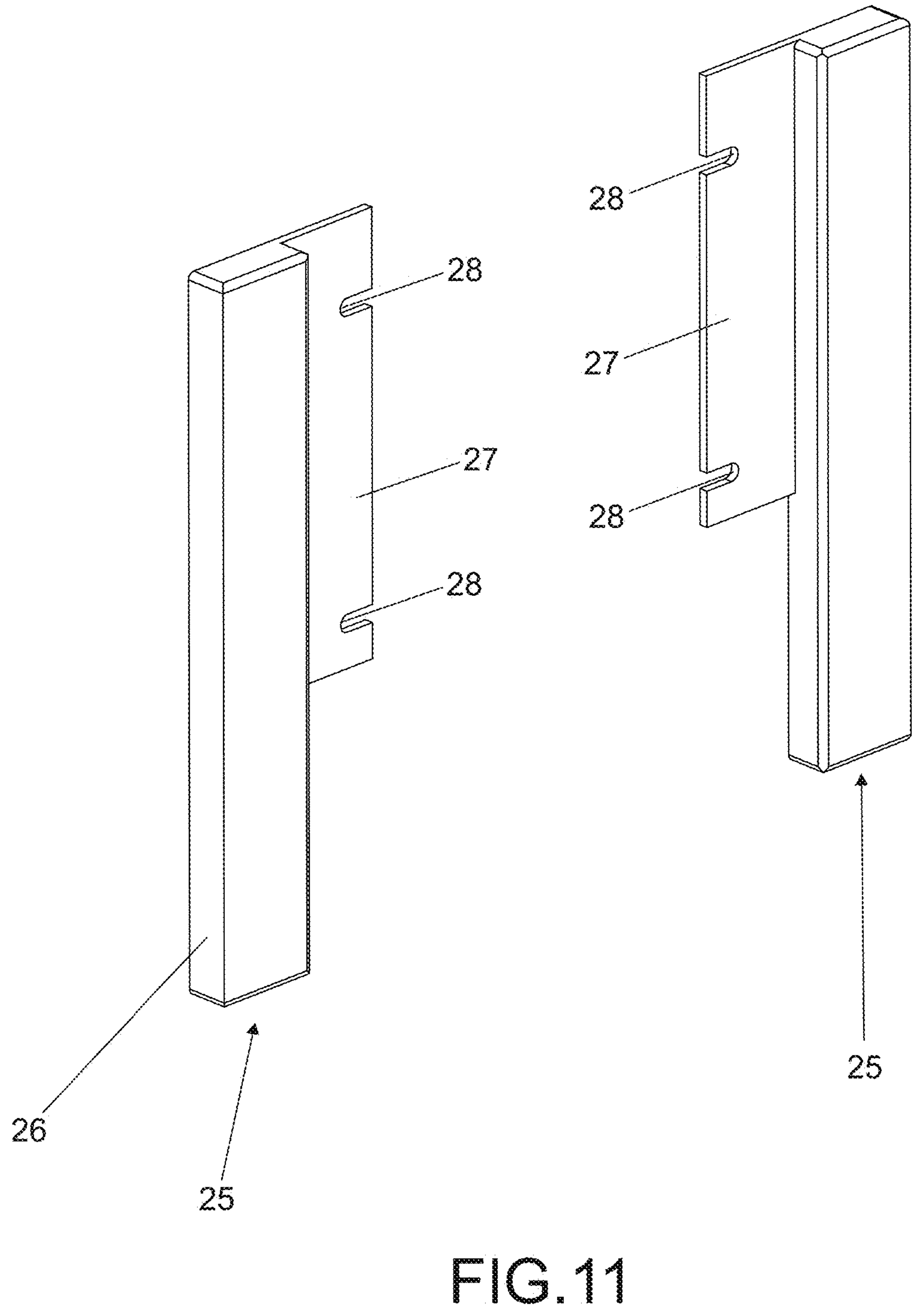
FIG. 11 shows a perspective view of the finishing plates for the NCR equipment, which is the finishing for the lower panel.

The reinforcement of the front dispenser 1A, separately shown on FIGS. 9 and 10 is defined as an extended parallelepiped-shaped box 6A, which features a front surface 7A and perimeter surfaces in relation to said front surface 7A which are defined as: upper surface 8A, lower surface 9A and side surfaces 10A with such items 7A, 8A, 9A and 10A only indicated on FIGS. 9 and 10.

The front surface 7A of the front dispenser reinforcement 1A features a single elongated pass opening 11A, which is placed horizontally and is only visible on FIGS. 8 and 9, being exclusively indicated on FIG. 9.

The side finishing plates are defined, individually, as a vertical bar 26, which, on its upper section and facing the center part of the equipment surface, features tabs 27, each including cutouts 28 facing the center of the equipment surface.

The invention claimed is:

1. A reinforcement assembly on an automatic teller machine (ATM), the reinforcement assembly comprising:
- a front dispenser fixed within an opening of a safe door of the ATM along welding lines;
- a lower panel fixed to the front disperser and to the safe door, wherein the lower panel comprises:
  - a laminar configuration with two vertical plate section-shaped branches which are joined together by a horizontal branch;
  - side cutouts facing downwards in the horizontal branch wherein the side cutouts being positioned in accordance to screws in the safe door; and
  - a center cutout facing downwards in the horizontal branch and positioned on an indent stripe of the horizontal bar; and
- a finishing plate installed on the lower panel.

2. The reinforcement assembly of claim 1, wherein the front dispenser is fixed within the opening of the safe door of the ATM along welding lines.

3. The reinforcement assembly of claim 1, wherein the finishing plate comprises:
- a rectangular outline plate having a rear surface,
- four pins extending from the rear surface of the rectangular outline plate;
- a large elongated opening; and
- a small elongated opening.

4. The reinforcement assembly of claim 1, wherein the front disperser comprises:
- upper, lower and side surfaces welded to the opening of the safe door of the ATM; and
- a front surface having a plurality of pass openings.

5. A reinforcement assembly on an automatic teller machine (ATM), the reinforcement assembly comprising:
- a pair of finishing plates attached to a safe door of the ATM;
- a front dispenser fixed to an opening of a safe door of the ATM along welding lines, wherein the front dispenser comprises:
  - a parallelepipied-shaped box
  - upper, lower and side surfaces welded to the opening of the safe door of the ATM; and
  - a front surface having a single opening; and
  - a finishing panel attached to the front dispenser and to the pair of finishing plates.

6. The reinforcement assembly of claim 5, wherein the pair of finishing plates comprises:
- a vertical bar;
- a tab attached to the vertical bar; and
- cut-outs in the tab.

* * * * *